July 14, 1953   O. P. HADLEY   2,645,006
METHOD AND MEANS FOR APPLYING BRITTLE BRAZING MATERIAL
Filed June 29, 1948
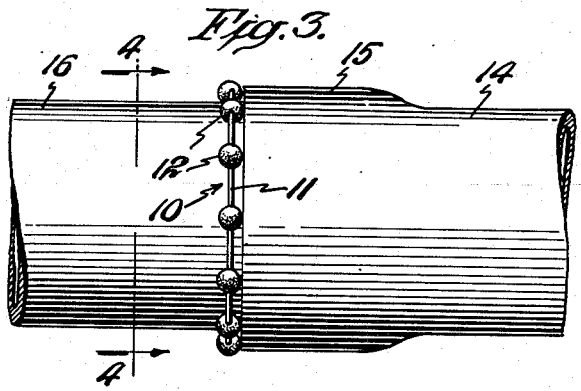
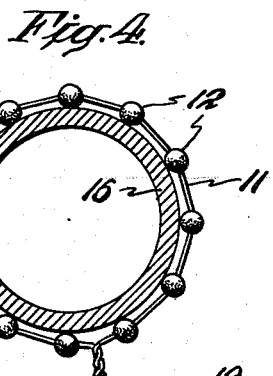
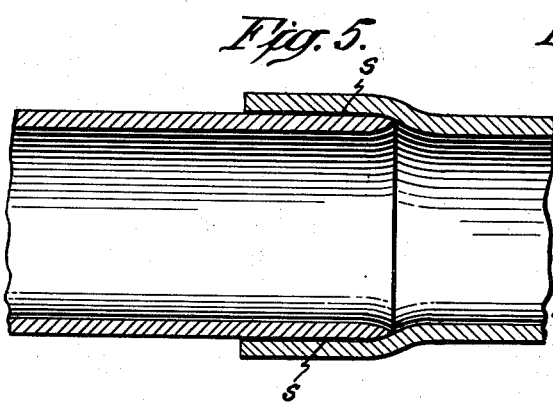
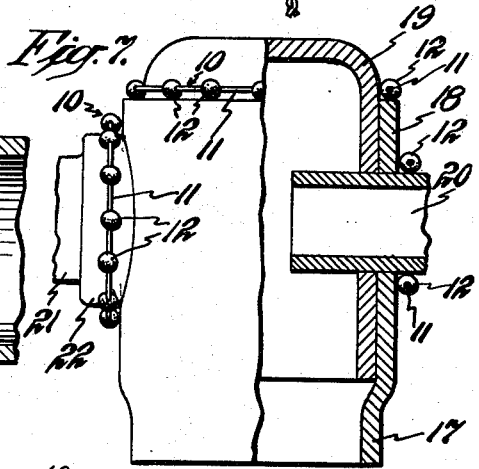
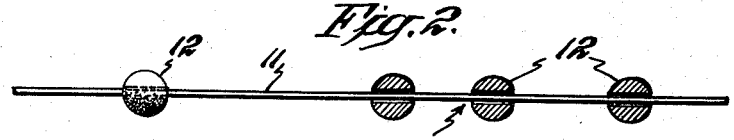
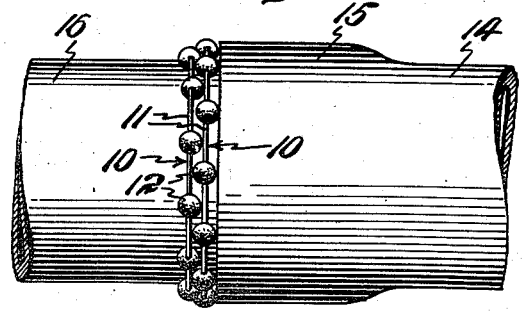
INVENTOR.
Orval P. Hadley
BY
Oliver S. Titcomb
his ATTORNEY Patented July 14, 1953

2,645,006

UNITED STATES PATENT OFFICE 2,645,006

METHOD AND MEANS FOR APPLYING BRITTLE BRAZING MATERIAL

Orval P. Hadley, Evansville, Ind., assignor to Servel, Inc., New York, N. Y., a corporation of Delaware Application June 29, 1948, Serial No. 35,749

5 Claims. (Cl. 29—374)

The present invention relates to uniting metal parts and more particularly to a method of an article for applying a brazing material to joints.

Metal parts may be united by brazing materials which fuse and flow by capillary action into the space between the parts to completely fill the joint. Iron or steel parts may be united in this manner by eutectic alloys. A joint formed by a eutectic alloy of iron and phosphorus is described in an application for United States Letters Patent of Robert S. Taylor et al., Serial No. 660,126, filed April 6, 1946, now Patent 2,487,001 issued November 1, 1949, and entitled Ammonia Refrigerating Apparatus. Iron phosphide and other brazing materials such as alloys of phosphorus, arsenic, antimony, sulphur and bismuth are not sufficiently ductile in solid form to adapt them to be wrapped around joints and must be cast to conform to the shape of the joint. Such brazing materials in powdered form are difficult to handle and care must be taken to be sure that a sufficient amount is applied to completely fill the joint.

The object of the present invention is to provide a method of an article for applying brazing material to joints which facilitates the application of the material and insures an equal distribution of a sufficient quantity thereof to completely fill the joints.

These and other objects will become more apparent from the following description and drawing in which like reference characters denote like parts throughout the several views. It is to be understood, however, that the drawing is for the purpose of illustration only and does not limit the scope of the invention, reference being had for this purpose to the appended claims. In the drawing:

Fig. 1 is a perspective view of a flexible strip for applying brazing material to a joint between parts to be united and showing beads of the material applied directly onto the periphery of a wire in spaced relation therealong;

Fig. 2 is a part sectional view of a modified form of flexible strip in which beads of brazing material are strung on a wire;

Fig. 3 is a longitudinal view of telescoped pipe sections showing a length of the flexible strip wrapped around one of the parts to apply the beads of brazing material adjacent the joint;

Fig. 4 is a transverse sectional view taken on line 4—4 of Fig. 3 showing the beads of brazing material arranged in spaced relation around the joint;

Fig. 5 is a longitudinal sectional view of the joint showing the manner in which the brazing material is drawn into the joint when fused;

Fig. 6 is a view similar to Fig. 3 showing several turns of the flexible strip wrapped around the joint to supply additional brazing material to the joint; and Fig. 7 is a view of an assembly of several parts showing how a number of joints may be made simultaneously.

In accordance with the method of the present invention the parts to be joined are so formed as to provide a capillary space between the parts. The brazing material, such as a eutectic alloy, is applied to a flexible strip of any suitable material which will not contaminate the alloy. For example, the flexible strip may be in the form of a wire, string or fabric and the brazing material may be applied to the strip as a powder, or as compacted beads of powder, or as beads of the metal alloy cast in suitable molds. Preferably, the brazing material in powdered form is compacted into beads arranged in spaced relation along a flexible wire. The beads of brazing material may be compacted directly onto the periphery of the wire or they may be compacted as individual beads and a number of the beads strung onto the wire. If necessary the beads of powdered brazing material may be sintered to increase the cohesion of the material. Such a flexible strip provides a predetermined quantity of brazing material per unit of length of the wire.

A length of flexible strip having the proper number of beads of brazing material to completely fill the joint is wrapped around one of the parts adjacent the joint to be bonded to hold the beads of material in place. The assembly with the beaded wire adjacent the joint is placed in a furnace and heated to a temperature at which the brazing material fuses. Upon fusion the brazing material flows into the joint by capillary action and completely fills the joint. By this method a sufficient amount of brazing material may be supplied at spaced points around the joint to insure complete filling of the joint and the flexible beaded strip facilitates the handling and application of the brazing material.

In the drawing two forms of flexible strip 10 are illustrated for applying the brazing material to the joint in accordance with the method of the present invention. In its broadest aspect the strip 10 may be made of any suitable flexible material with the brazing material merely applied to its surface. In the embodiment illustrated in Fig. 1 the flexible strip is a wire 11 and the brazing material, such as a eutectic iron phosphide alloy, is applied directly on the periphery of the wire in the form of beads 12 arranged in spaced relationship therealong. The beads 12 may be cast by pouring molten alloy into molds surrounding the wire 11 or the beads may be produced by powdered alloy compacted between suitable dies into briquettes surrounding the wire. The cohesion of the powdered alloy when compacted at high pressure is usually sufficient to retain the brazing material in the form of a bead. However, the bead-like briquettes may be sintered, if necessary, to increase the strength and cohesion of the powdered brazing material. With beads of brazing material compacted directly onto the wire 11 the strip will have a predetermined amount of brazing material per unit of length.

In the embodiment illustrated in Fig. 2, the brazing material is cast or powdered material compacted into beads 12 and the beads strung onto a wire 11. With a strip 10 of the type illustrated in Fig. 2 the amount of material to be applied to a joint may be varied by merely stringing a greater or lesser number of beads 12 onto the wire 11. With either form of strip illustrated in Figs. 1 and 2 the brazing material will be equally distributed along the flexible wire 11.

In Fig. 3 a telescoped type of joint is illustrated with a beaded strip 10 of brazing material wrapped around the joint. The joint comprises a pipe 14 having its end 15 belled to receive the end of a pipe 16. The ends of the pipes 14 and 16 should be so formed as to closely fit each other and provide a capillary space s therebetween. The flexible strip 10 is merely wrapped around the pipe 16 adjacent the joint and may be held in place by twisting the ends of the wire 11 as illustrated in Fig. 4. By reference to Fig. 4 it will be noted that the beads 12 of brazing material on the wire 11 are equally spaced around the periphery of the joint.

The assembled pipes 14 and 16 with the flexible strip 10 of brazing material 12 wrapped around the joint is placed in a furnace and heated to a temperature at which the brazing material fuses. Upon fusion the brazing material 12 is drawn into the space s between the parts of the joint as illustrated in Fig. 5 by capillary action. If sufficient brazing material is provided it will completely fill the space s and provide an hermetically sealed joint substantially as strong the the pipes 14 and 16.

When a strip 10 of the type illustrated in Fig. 1 is used on large joints it may be necessary to make several turns of the strip around the joint. Such an arrangement is illustrated in Fig. 6 where two turns of the strip 10 is illustrated with the beads 12 of one turn positioned between the beads 12 on the other turn. Such an arrangement insures the application of sufficient material to completely fill the space s of the joint.

Fig. 7 illustrates an assembly of parts which may be united in a single operation. The assembly illustrated in Fig. 7 comprises a pipe 17 having a belled end 18 for receiving an inverted cup-shaped cap 19. Extending through one side of the belled portion 18 and inverted cup-shaped member 19 is a pipe 20. At the opposite side is a second pipe 21 having an upset flange or saddle 22 abutting the side of the bell-shaped portion 18. A predetermined length of flexible strip 10 is then wrapped around each of the pipes 20 and 21 adjacent the belled portion 18 of pipe 17 and a length of strip also is wrapped around the inverted cup-shaped member 19 adjacent the joint between it and the belled portion 18. The complete assembly may then be inserted in a furnace and heated to the fusion temperature of the brazing material which flows into the crevices between the joints by capillary action and fills the three joints simultaneously. By using such flexible material strips 10 a complete assembly of parts may be united by merely wrapping sections of strip 10 around the parts adjacent the joints and inserting the whole assembly into a heating furnace.

It will now be observed that the present invention provides a method of and flexible strip for applying brazing material to joints which facilitates the application of the material and insures the application of a sufficient quantity of the material to completely fill the joint. It will also be observed that the present invention provides a method of bonding the joints between metal parts which requires only the wrapping of a flexible strip around the parts adjacent the joint and heating the parts to the fusion temperature of the brazing material.

While the method and two forms of material applying strips have been illustrated and described, it will be understood that other forms of strips may be used without departing from the spirit and scope of the invention. Therefore without limitation in this respect the invention is defined by the following claims.

I claim:

1. The method of bonding the joint between metal parts which comprises applying beads of a brittle brazing material in spaced relation on the periphery of a flexible strip of a suitable non-contaminating material, wrapping the beaded strip around one of the parts adjacent the joint, and heating the assembly to a temperature at which the beads of brazing material fuse and flow into the joint.

2. The method of bonding the joint between iron or steel parts which comprises applying beads of iron phosphide in spaced relation on a flexible wire of a suitable non-contaminating material, wrapping the flexible beaded wire around one of the parts adjacent the joint, and heating the assembly to a temperature at which the iron phosphide powder fuses and flows into the joint.

3. An article of manufacture comprising a flexible wire with beads of a brittle powdered brazing material compacted on the wire at spaced points along its periphery, said wire being composed of a suitable material which will not contaminate the brazing material.

4. An article of manufacture comprising a flexible wire having beads of iron phosphide at spaced points therealong, said wire being composed of a suitable material which will not contaminate the iron phosphide.

5. An article of manufacture comprising a flexible carrier strip having beads of a brittle brazing material at spaced points thereon, said carrier strip being composed of a suitable material which will not contaminate the brazing material.

ORVAL P. HADLEY.

References Cited in the file of this patent

UNITED STATES PATENTS

| Number | Name | Date |
| --- | --- | --- |
| 297,738 | Allen | Apr. 29, 1884 |
| 408,314 | Moore | Aug. 6, 1889 |
| 1,205,233 | McCrudden | Nov. 21, 1915 |
| 1,635,222 | Plaut | July 12, 1927 |
| 1,756,568 | Pennington | Apr. 29, 1930 |
| 1,783,134 | Orenstein | Nov. 25, 1930 |
| 2,157,918 | Rankin | May 9, 1939 |
| 2,197,039 | Gottlieb | Apr. 16, 1940 |

FOREIGN PATENTS

| Number | Country | Date |
| --- | --- | --- |
| 736 | Great Britain | of 1914 |
| 12,254 | Switzerland | Apr. 7, 1896 |
| 133,497 | Austria | May 26, 1933 |
| 487,263 | Great Britain | June 17, 1938 |